United States Patent [19]

Hollis, Jr. et al.

[11] 4,303,562

[45] Dec. 1, 1981

[54] LIGNIN-CONTAINING RESIN ADHESIVE

[75] Inventors: John W. Hollis, Jr., Schofield; Michael W. Schoenherr, Wausau, both of Wis.

[73] Assignee: American Can Company, Greenwich, Conn.

[21] Appl. No.: 171,795

[22] Filed: Jul. 24, 1980

[51] Int. Cl.$^3$ .......................... C08G 8/28; C08L 97/00
[52] U.S. Cl. ..................................... 260/17.5; 156/335
[58] Field of Search ......................................... 260/17.5

[56]  References Cited

U.S. PATENT DOCUMENTS

| | | | |
|---|---|---|---|
| 2,168,160 | 8/1939 | Hochwalt et al. | 260/17.5 |
| 2,282,518 | 5/1942 | Hochwalt et al. | 260/17.5 |
| 3,090,700 | 5/1963 | Ball et al. | 260/17.5 X |
| 3,185,654 | 5/1965 | Ball et al. | 260/17.5 |
| 3,216,839 | 11/1965 | Webster | 260/17.5 X |
| 3,454,508 | 7/1969 | Herrick et al. | 260/17.5 |
| 3,551,405 | 12/1970 | Read | 260/17.5 X |
| 3,864,291 | 2/1975 | Enkvist | 260/17.5 |
| 4,113,675 | 9/1978 | Clarke et al. | 260/17.5 |

*Primary Examiner*—Earl A. Nielsen
*Attorney, Agent, or Firm*—Robert P. Auber; Stuart S. Bowie; Ernestine C. Bartlett

[57]  ABSTRACT

Novel lignin-phenol-formaldehyde resins, suitable for use as wood bonding adhesives, are provided by a two-step method which comprises reacting formaldehyde and phenol in the presence of an alkaline catalyst for a period sufficient to produce a partially condensed phenol-formaldehyde resin, thereafter reacting said precondensed resin with sodium hydroxide, formaldehyde and a lignin concentrate having at least 40% solids and comprising lignin dissolved in (a) phenol and water; or (b) phenol, water and sodium hydroxide or ammonia, the lignin to phenol weight ratios in said solution being less than 70:30 and more than 40:60. The second stage of the method is conducted at reflux temperature initially after which reaction is conducted below reflux temperature to control the degree of condensation.

10 Claims, No Drawings

LIGNIN-CONTAINING RESIN ADHESIVE

BACKGROUND OF THE INVENTION

Prior Art

The prior art is believed to be best exemplified by the following patents and literature references:
Hochwalt et al U.S. Pat. No. 2,168,160—08/39
Hochwalt et al U.S. Pat. No. 2,282,518—05/42
Ball et al U.S. Pat. No. 2,997,466—08/61
Webster U.S. Pat. No. 3,216,839—11/65
Herrick et al U.S. Pat. No. 3,454,508—07/69
Read U.S. Pat. No. 3,551,405—12/70
Enkvist U.S. Pat. No. 3,864,291—02/75
Johansson U.S. Pat. No. 4,113,542—09/78
Nam et al, *Wood Research*, Vol. 40, pp. 1–17 Kyoto, Japan, March, 1967.
Merewether, "The Precipitation of Lignin from Eucalyptus Kraft Black Liquors," *TAPPI*, Vol. 45, No. 2, pp. 159–163, February, 1962.
Dolenko et al, "Resin Binders From Kraft Lignin," *Forest Products Journal*, Vol. 28, No. 8, pp. 41–46, August 1978.
Forss et al, "Finnish Plywood, Particleboard, and Fiberboard Made With A Lignin-Base Adhesive," *Forest Products Journal*, Vol. 29, No. 7, pp. 39–43, July, 1979.
Adams et al, U.S. patent application Ser. No. 097,052 filed Nov. 23, 1979 entitled "High Solids, Low Viscosity Lignin Solutions."

FIELD OF THE INVENTION

This invention is related to lignin and lignin products derived from black liquor.

Lignin is derived from wood as a by-product in the pulping process and as an abundant, natural and renewable product, has tremendous potential for many industrial uses as replacements for increasingly scarce and expensive petroleum based materials. Lignin has found limited utilization commercially, however, because it is complex chemically and physically and its characteristics have been found to vary considerably, depending on many factors including variations in pulping conditions, the kind of wood being pulped, the conditions under which it is recovered, etc.

It is known that lignin obtained as a by-product in alkaline pulping processes contains both aliphatic and aromatic hydroxyl groups which are attractive sites for chemical modifications. Because of the similarity of the hypothesized chemical structure of alkali lignin to phenolic resins, lignin has been proposed as a replacement for phenol in resins.

One such technological area where replacement of phenol by lignin has been suggested is in the plywood industry where lignin has been proposed as at least a partial substitute for expensive petro-chemicals such as phenol in phenol-formaldehyde (P-F) resins that are employed as adhesives. Such P-F resins are made by condensing phenol with formaldehyde in water using sodium hydroxide catalyst to make at least 35% to 45% solids resin solutions.

As a general rule, it has been impractical to use lignin-phenol-formaldehyde (L-PF) resins as adhesives. One of the reasons is believed to be related to the molecular size of the adhesives. The lignin molecules have generally been too large to penetrate the surface of the wood to get good adhesion. The size of the lignin molecules have also prevented its condensation with phenol to any meaningful extent. For these reasons, when large amounts of lignin are employed in such resins, adhesive properties have been found to deteriorate.

Various workers in the art have proposed various means for employing lignin products as substitutes or extenders for phenolic reactants. For example, Dolenko et al, "Resin Binders From Kraft Lignin," *Forest Products Journal*, Vol 28, No. 8, pp. 41–46, August, 1978; Johansson, U.S. Pat. No. 4,113,542; Forss et al, "Finnish Plywood, Particleboard and Fiberboard Made With A Lignin-Base Adhesive," *Forest Products Journal*, Vol. 29, No. 7, pp. 39–43, July, 1979; Hochwalt et al, U.S. Pat. Nos. 2,168,160 and 2,282,518 are each directed to aspects of such reactions. Webster, U.S. Pat. No. 3,216,839 is directed to replacement of phenolic components in the production of methylolated resole resins. Nam et al, *Wood Research*, Vol. 40, pp. 1–17, Kyoto, Japan, March, 1967, similarly are concerned with utilizing lignin as a source of phenol in phenol-formaldehyde resin adhesives and report improved results when phenol and formaldehyde are pre-reacted before reacting lignin. Bonding results were viewed as inconclusive, however, depending on the viscosity of the adhesive, the resin concentration, the lamination conditions used, and other considerations.

U.S. application Ser. No. 097,052 filed Nov. 23, 1979, pending commonly assigned herewith, is addressed to the problem of providing high solids, liquid lignin solutions. As disclosed therein, many manufacturers require high solids, lignin solutions for many of the applications in which it is desired to replace or extend phenol with lignin products. Such high solids, liquid lignin solutions, prior to Ser. No. 097,052, were not readily available primarily because of the solubility characteristics of lignin and the characteristics of lignin solutions. For example, lignin and lignin products derived from alkaline wood pulping black liquors are damp granules, not liquids, at 40% to 50% or higher solids and are usually dried to give powders. Such damp granules or powders are insoluble in water but may be dispersed in water with alkali to make solutions containing up to about 35% lignin and less than 40% solids. At higher concentrations of lignin or at higher solids, such alkali-water solutions become too viscous to handle. Additionally, it requires at least about 10% sodium hydroxide, based on the weight of the lignin, to make such solutions. Although this 10% sodium hydroxide on lignin level is less than the total amount of sodium hydroxide used as a catalyst in the phenol/formaldehyde condensation, some resin producers prefer to start the condensation reaction with little or no alkali and to add the necessary alkali incrementally to control the condensation. For these users, the 10% sodium hydroxide on lignin level will render sodium hydroxide-lignin solutions in water unfit for their requirements.

In said copending U.S. application Ser. No. 097,052, it was found that the solubility of lignin is related to a number of factors including the lignin source, the history of the black liquor from which it is derived, and the amount of lignin solids put in solution. For example, lignin from aged and oxidized black liquor is more difficult to dissolve and keep in solution than lignin obtained from fresh black liquor. Solution stability problems were sometimes encountered with solutions having solids content within the range below about 75% solids resulting in unstable solutions that separate into two phases. Morever, the nature of the instability was found to be different with solutions having solids content below about 40–45% lignin solids when compared to solutions having solids content above about 40–45% lignin solids. For example, with solutions of lignin from aged black liquor with a solids content below about 40–45%, such as the 20% lignin solids of the Hochwalt et al U.S. Pat. Nos. 2,168,160 and 2,282,518, the solutions separate into two phases so rapidly that the mixtures cannot be stored and dispensed as a uniform composition and therefore have no commercial value. With solutions of lignin from aged black liquor in the 40–75% lignin solids range, some lignins are readily soluble and stay in solution for extended periods without any separation while other lignins form unstable solutions that separate into phases. The unstable solutions encountered in this solids range, however, separate so slowly that the mixtures can be transported and used without problem.

Additionally, it was found that low solids materials are not suitable for replacing phenol in P-F resins at the desired 20–50%, or higher, replacement level. For example, for the desired replacement level, lignin solutions containing less than about 40–45% solids cannot be used in reactions designed to produce 35–45% P-F resins due to the amount of water that is generated during the reaction. The resulting resins cannot be concentrated by evaporating water because additional heating advances the resins beyond the desired stage of cure. Therefore, solutions containing only 20% lignin solids would introduce too much water into the system for some producers of P-F resin adhesives.

The above problems were overcome in said U.S. Ser. No. 097,052 by provision of high solids, low viscosity concentrate solutions of lignin comprising at least 40% total solids employing phenol-water or phenol-water-sodium hydroxide or ammonia as the solvent media. The high solids solutions have viscosities below about 10,000 cps. at 25° C. and they are convertible to viscosities substantially below 10,000 cps. upon warming to temperatures up to about 50° C. The solution components are each components that may be used directly in a phenol-formaldehyde condensation.

The present invention relates to novel and improved lignin-phenol-formaldehyde (L-PF) resin adhesives and to a method for producing such resin adhesives from the high solids, low viscosity lignin concentrate solutions of said Ser. No. 097,052. The invention contemplates the use, as phenol extenders, of lignin-phenol-water concentrate solutions containing at least 40% solids and viscosities not higher than 10,000 cps. at 25° C. wherein the lignin to phenol ratios, by weight, are less than 70:30 and more than 40:60 as well as such solutions wherein from about 2 to 20% by weight of lignin is replaced with sodium hydroxide or ammonia.

Preferred solutions will contain at least about 32% to 35% by weight of lignin in a lignin to phenol ratio of 50:50, will have a solids content of about 60 to 70% and will be stable on storage and during shipment under normal conditions of temperature and pressure, i.e., room temperature and atmospheric pressure. An especially preferred solution comprises about 32% lignin, 32% phenol and about 36% water.

Water necessary for solution may be present in the damp lignin cake initially dissolved or it may be added to the phenol or to the lignin which may initially be in powdered form.

Such preferred compositions will be derived by dissolving lignin filter cake containing about 45 to 50% solids in phenol.

According to the method of this invention, an improved lignin-phenol-formaldehyde resin for use in wood bonding is provided by a method comprising the steps of:

(1) reacting a mixture of phenol, formaldehyde and water in the presence of sodium hydroxide under reflux conditions for a period sufficient to produce a partially condensed phenol-formaldehyde resin;

(2) forming a mixture of the partially condensed phenol-formaldehyde resin with sodium hydroxide, formaldehyde and a lignin concentrate solution having at least 40% solids comprising normally water-insoluble and phenol-insoluble alkali lignin dissolved in a solvent selected from the group consisting of (a) phenol and water and (b) phenol, water and sodium hydroxide or ammonia; the lignin to phenol weight ratios in said solutions being less then 70:30 and more than 40:60 and said sodium hydroxide or ammonia being present in amounts of 2 to 20% based on the weight of lignin or phenol in the solution; and (3) reacting said mixture to form a lignin-phenol-formaldehyde resin.

It has been found that the addition of lignin-phenol concentrate together with additional formaldehyde and caustic to the partially condensed phenol-formaldehyde resin results in a resin that exhibits improved properties as a wood-adhesive. While the exact reason for the improved results is not known with certainty, it is believed that precondensing the phenol and formaldehyde allows a better reaction of the phenol-formaldehyde polymeric portion of the resin subsequently produced. It is known that inclusion of lignin initially in the P-F resin synthesis causes resin viscosity to increase more rapidly than when phenol alone is employed. It is also known that condensation of phenol with formaldehyde using alkaline catalyst proceeds through three stages, the first stage resulting in a comparatively small molecule compared to the lignin molecule. It is believed that delaying addition of the lignin-phenol component permits the phenol-formaldehyde polymer, which achieves a larger molecular size more slowly than lignin, to reach a more functional molecular size with more reactive sites. Addition of the lignin-phenol concentrate, additional formaldehyde and catalyst is believed to permit the production of a more fully reacted and more complex L-PF resin that exhibits improved bonding. Higher wood failures are achieved in bonding tests and longer assembly times are possible. Higher wood failures are seen when adhesive is applied to plywood panels that are subsequently allowed to stand up to two hours before hot pressing, as illustrated hereinbelow.

Improved resin adhesives may be achieved employing any of the lignin-phenol-water concentrates as disclosed in said copending U.S. application Ser. No. 097,052 referred to hereinabove. Such concentrates employ lignin or alkali lignin produced as a by-product of alkaline pulping, using either the soda process or the sulphate process. The lignin is recovered from black liquor by acid precipitation, using either sulphuric acid or carbon dioxide, at a pH of about 8.0 to 9.0 and wherein the precipitated lignins are agglomerated, preferably by heating after precipitation, after which the agglomerated particles are cooled, filtered and washed, preferably to have an ash content of from about 8 to 14% or lower, if desired.

Suitable L-PF resins may be produced in accordance with the invention employing proportions of reactants and conditions that are subject to variation.

1. Partial Condensation Step

The ratio of phenol to formaldehyde may be varied within limits that may range from 1.5 to 3.0 moles of formaldehyde for each mole of phenol in the presence of from about 0.05 to 0.5 moles sodium hydroxide. Preferably, the reactants are heated, under reflux conditions, to reflux during a 30 to 90 minute period after which the mixture is refluxed for about 30 to 90 minutes and cooled to terminate the reaction. Reflux temperatures of about 90° to 100° C. are involved.

2. Formation of L-PF Resin

Upon termination of the partial condensation step, from about 0.05 to 0.5 moles of sodium hydroxide, 0.75 to 1.5 moles of formaldehyde and an amount of a lignin-phenol-water concentrate, such that the lignin contained represents from about 10 to 30% of the total phenolic component in the final resin, is added to the partially condensed P-F resin. By "total phenolic component" is meant the total amount of phenol and lignin present in the final resin. The reactants are heated directly to reflux and are allowed to reflux for about 10 to 30 minutes after which the temperature is lowered to about 75° to 85° C. and maintained until completion of the reaction, usually for a period of 30 to 120 minutes during which time any remaining sodium hydroxide is added. Reacting the final mixture at reflux temperature followed by completion of the reaction at less than reflux temperature has been found to be necessary to control the extent of polymerization of the final L-PF resin produced.

The mole ratio of phenolic component to formaldehyde to sodium hydroxide in the final L-PF resin produced will vary from 1:1.5:0.1 to 1:2:1. In the resulting resin, lignin is employed to extend the phenol-formaldehyde resin and from about 10 to 30% phenol is replaced by the lignin.

The resulting resins have been found to exhibit superior wood bonding properties when compared to resins produced without first partially condensing phenol and formaldehyde. Additionally, longer assembly times are possible, i.e. improved results have been observed even when the adhesive is applied to the wood and allowed to stand up to 2 hours before hot pressing to effect the bond.

The following examples will serve to illustrate the invention.

EXAMPLE 1

Part A. Preparation of Lignin-Phenol Concentrate 910 kg. of black liquor generated by pulping Douglas fir wood chips by the sulfate process and containing 35% solids was acidified with concentrated sulphuric acid to pH 8.1 and the precipitated lignin was agglomerated by heating. The agglomerated lignin was cooled, filtered and washed with water to produce 195 kg. of lignin cake that contained 50% solids. The solids had an ash content of 8.2% as determined by American Can Company Method Analytical Procedure 5.51. In this analytical method, ash content is defined as the residue remaining after ignition of a sample at 800° C. until all carbon is burned off. The procedure involves firing an aliquot sample at 800° C. for 20 minutes. Ash content is calculated according to the equation:

$$A = (C(100)/B)$$

where A is the ash content of the sample, %; B is the weight of the sample before firing, g.; and C is the weight of the ash residue, g.

To make a solution, 167 g. of 90% phenol was poured into a suitable container and 300 g. of the 50% lignin was dissolved therein, with stirring. The solution had a viscosity of 2500 cps. at 25° C. and contained 64.2% solids.

Part B. Preparation of L-PF REsin With Pre-Condensation Step

A 1-liter, 3-necked round bottom flask equipped with an electric stirrer, thermometer, reflux condenser and heating mantle was used for preparing all resins. 14.4 grams of 90% phenol, 16.9 grams of 37% formaldehyde, 1.4 grams of 50% sodium hydroxide and 25.1 grams of water were added to the flask and heated to reflux at 95° C. over a period of 90 minutes. Refluxing was continued for 70 minutes after which the mixture was quickly cooled to room temperature.

There was added 2.1 g. of 50% sodium hydroxide, 16.8 grams of 37% formaldehyde and 20.3 grams of 64.2% solids solution of lignin in a phenol-water mixture prepared in Part A hereinabove. The mixture was heated directly to reflux at 95° C. and was refluxed for 20 minutes at refluxing temperature after which it was reacted at 80° C. for thirty minutes. An additional 2.1 grams of 50% sodium hydroxide was added and the mixture was reacted at 80° C. for 27 minutes.

When cooled to 25° C., the resin had a viscosity of 460 cps., a pH of 11.4 and resin solids of 37.2%.

Part C. Preparation of L-PF Resin Without Pre-Condensation Step

Utilizing the apparatus of Part B above, there was added to the flask 14.4 grams of 90% phenol, 20.3 grams of 64.2% solids solution of lignin in a phenol-water mixture prepared in Part A above, 33.7 grams of 37% formaldehyde, 25.1 grams of water and 1.4 grams of 50% sodium hydroxide. The mixture was slowly heated to reflux at 95° C. over a period of 90 minutes. Refluxing was continued for 50 minutes after which the mixture was quickly cooled to room temperature. After adding 3.1 grams of 50% sodium hydroxide, the solution was heated to 85° C. and reacted at this temperature for 60 minutes. An additional 2.1 grams of 50% sodium hydroxide was added and the solution reacted at 80° C. for 35 minutes.

When cooled to 25° C., the resin had a viscosity of 650 cps., a pH of 11 and resin solids of 38%.

EXAMPLE 2

The resins of Parts B and C of Example 1 were compounded into plywood glues with identical amounts of identical components comprising fillers, a defoaming agent, sodium hydroxide and water employing methods well known in the art. Batches of 396.5 gm. total weight were prepared in a 600-ml. beaker using a mixer with a rheostat speed control. Glues with viscosities of 4600 cps. for Resin A (The L-PF Resin of the Invention) and 9000 cps. for Resin B (The L-PF Control Resin), respectively, were obtained.

Adhesive quality was tested by gluing 17.8×25.4×m., 3-ply panels of Douglas fir veneers cut 3.2 mm. thick. Weighed amounts of glue were applied to both sides of the center ply. Wood coated with glue was sandwiched between two outer, face plies so that the grain of the center ply ran at right angles to the grain of the face plies. Before gluing, all veneers were dried a minimum of 24 hours at 63° C. in a forced-draft oven.

The center ply veneer was weighed and glue poured on one side to get the desired weight which is one-half the amount for applying 56-pounds per thousand square feet of double glue line (MDGL). The glue was spread with a small paste brush as quickly as possible. The veneer was re-weighed and minor adjustments made to bring the glue applied to the correct weight. A face ply of veneer was placed over the coated surface and the assembly was inverted on a scale to apply glue to the other side of the center ply. The second face ply was then placed on the assembly. The process took from 4–6 minutes.

Stand time was measured from the time the panel was completely assembled until it was put into the press. For purposes of comparison, samples were tested after stand times of 15, 30, 45, 60 and 120 minutes, respectively. During this period a 25×38-cm. metal pan weighing 400 gm. was put on the panels to keep the plies from separating. Hot pressing 6 minutes at 175 psi. was done in a Wabash press with 17.8×25.4-cm. platens electrically heated to 285° F. After cooling, samples were sawed, kerfed, soaked and pulled apart under shear stress according to methods outlined in National Bureau of Standard (NBS) Voluntary Products Standard PS 1-74. In particular, the samples were exposed to vacuum pressure while submerged in water and tested according to this method. Wood failure values were obtained by examining sheared surfaces after drying. Values above 85% are acceptable. Higher values indicate better bonding. The results were as reported in the Table that follows:

TABLE

Vacuum Pressure Test Results At Various Assembly Times - 56 lb./MDGL

Vacuum Pressure Test Mean Percent Wood Failure and 95% Confidence Interval

| Resin | 15 min. | 30 min. | 45 min. | 60 min. | 120 min. |
|---|---|---|---|---|---|
| A | 96 ± 2.7 | 96 ± 1.3 | 96 ± 1.6 | 94 ± 2.3 | 94 ± 1.3 |
| B | 88 ± 5.7 | 94 ± 3.8 | 96 ± 1.3 | 91 ± 2.4 | 92 ± 4.1 |

It will be seen from the above results that the invention provides an improved resin and method for its production employing high solids, low viscosity lignin solutions, that are capable of storage and shipment and suitable as replacements for phenol as reactants in a method comprising the addition of such lignin solution to a partially condensed phenol-formaldehyde resin.

While the invention has been described and illustrated by way of preferred embodiments thereof, it will be apparent to those skilled in the art that variations and modifications may be made without departing from the scope of the present invention as defined by the appended claims.

What is claimed is:

1. A method for producing a lignin-phenol-formaldehyde resin which comprises the steps of:
   (1) reacting a mixture of phenol and formaldehyde in the presence of sodium hydroxide catalyst under reflux conditions for a period sufficient to produce a partially condensed phenol-formaldehyde resin;
   (2) forming a mixture of the partially condensed phenol-formaldehyde resin with sodium hydroxide, formaldehyde and a lignin concentrate solution having at least 40% solids comprising normally water-insoluble and phenol-insoluble alkali lignin dissolved in a solvent selected from the group consisting of (a) phenol and water, and (b) phenol, water and sodium hydroxide or ammonia; the lignin to phenol weight ratios in said solutions being less than 70:30 and more than 40:60; and
   (3) reacting said mixture to form a lignin-phenol-formaldehyde resin.

2. A method as claimed in claim 1 in which the phenol and formaldehyde in step (1) are reacted at a temperature of from about 70° to 100° C. for a period of from about 30 to 90 minutes.

3. A method as claimed in claim 2 wherein the reaction mixture is cooled to terminate reaction.

4. A method as claimed in claim 3 wherein said cooled mixture is admixed with sodium hydroxide, formaldehyde and a lignin-phenol concentrate comprising a lignin to phenol weight ratio of 50:50 and having a solids content of about 64%.

5. A method as claimed in claim 4 wherein the admixture is reacted under reflux conditions at a temperature of about 90° to 100° C. for a period of 10 to 30 minutes followed by reaction at a temperature of about 75° to 85° C. for a period of about 30 to 120 minutes.

6. A method for producing a lignin-phenol-formaldehyde resin which comprises the steps of:
   (1) reacting a mixture of 1.5 to 3 moles of formaldehyde with 1 mole of phenol in the presence of 0.05 to 0.5 moles sodium hydroxide at a temperature of about 70° to 100° C. for 30 to 90 minutes to effect partial condensation of said phenol and formaldehyde;
   (2) cooling the mixture to terminate reaction;
   (3) forming a mixture of the partially condensed phenol-formaldehyde resin with 0.05 to 0.5 moles sodium hydroxide, 0.75 to 1.5 moles formaldehyde and a lignin-phenol-water concentrate solution in an amount such that the lignin contained will comprise from about 10 to about 30% of the total phenolic component in the final resin, said concentrate solution having a solids content of at least 40% and a lignin to phenol weight ratio of about 50:50;
   (4) reacting said mixture at a temperature of about 90° to 100° C. for a period of about 10 to 30 minutes followed by reaction at 75° to 80° C. for a period of about 30 to 120 minutes; and
   (5) recovering a lignin-phenol-formaldehyde resin.

7. A method as claimed in claim 6 wherein said lignin-phenol-formaldehyde resin has a viscosity of about 460 cps. at 25° C., a pH of about 11.4 and about 37% solids content.

8. An improved wood-bonding adhesive comprising lignin-phenol-formaldehyde resin produced by the method of claim 1.

9. An improved wood-bonding adhesive comprising lignin-phenol-formaldehyde resin produced by the method of claim 5.

10. An improved wood-bonding adhesive comprising lignin-phenol-formaldehyde resin produced by the method of claim 6.

* * * * *